United States Patent Office 3,541,100
Patented Nov. 17, 1970

---

3,541,100
BENZHETEROAZOLO[2,3-a]ISOQUINOLIUM SALTS
Paul Ramirez, Spring Valley, N.Y., and Charles Frederick Howell, Upper Saddle River, and Robert Allis Hardy, Jr., Ridgewood, N.J., assignors to American Cyanamid Company, Stamford, Conn., a corporation of Maine
No Drawing. Filed Dec. 14, 1967, Ser. No. 690,414
Int. Cl. C07d 49/38
U.S. Cl. 260—286                              8 Claims

---

ABSTRACT OF THE DISCLOSURE

The preparation of substituted benzoheterazoloisoquinolinium salts by acid-catalyzed cyclization of 2-($\alpha$-cyano-o-tolyl)benzheterazoles such as 2-($\alpha$-cyano-o-tolyl)benzothiazole or 2-($\alpha$-cyano-o-tolyl)benzoxazole. The novel products have shown anti-inflammatory activity and central nervous system (CNS) depressant activity.

---

SUMMARY OF THE INVENTION

The substituted benzoheterazoloisoquinolinium salts of the present invention can be illustrated by the following formula:

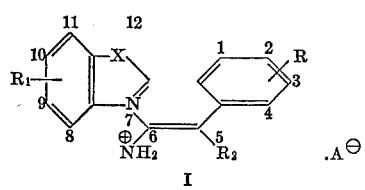

wherein R and $R_1$ are selected from the group consisting of hydrogen, lower alkyl, halogen, trifluoromethyl, nitro, lower alkyl mercapto, lower alkoxy, hydroxy, amino, lower alkylamino, di(lower alkyl)amino, di(lower alkyl)sulfamoyl, cyano, lower alkanoyl, lower alkyl sulfinyl, and lower alkyl sulfonyl; $R_2$ is selected from the group consisting of hydrogen, lower alkyl and ar(lower)alkyl; X is selected from the group consisting of oxygen, sulfur, >NH and >N-lower alkyl and $A^\ominus$ is the anion of a non-toxic acid.

The compounds of this invention are, in general, colored crystalline solids, (sometimes yellow to orange), soluble in water, but moderately soluble in polar organic solvents such as methanol, ethanol, acetic acid and the like. They are ionic substances which dissolve in water to give approximately neutral solutions. These compounds are reactive under certain conditions. Treatment of aqueous solutions with alkali such as sodium hydroxide precipitates intensely colored water insoluble compounds (II) which rearrange at room temperature to the starting 2-($\alpha$-cyano-o-tolyl)benzheterozoles (III), and which may be reconverted to the ionic compounds of this invention (I) upon treatment with acid.

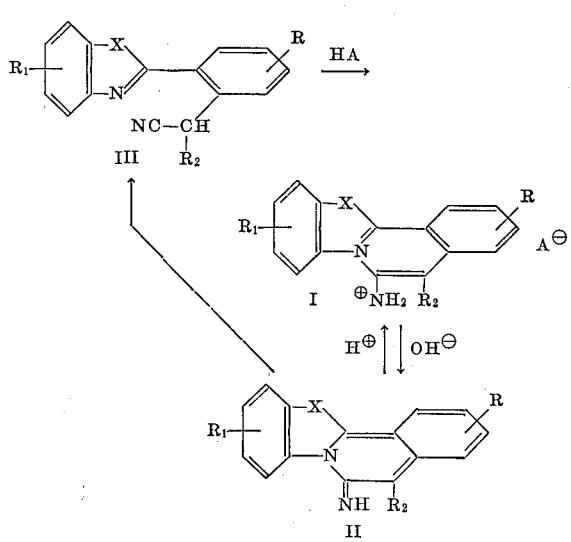

wherein R, $R_1$, $R_2$ and X are as defined hereinabove. Moreover, while a conventional representation of the ionic compounds of this invention is shown in structure I above, other resonance structures such as Ib, and Ic may be present and are intended to be included within the scope of this invention:

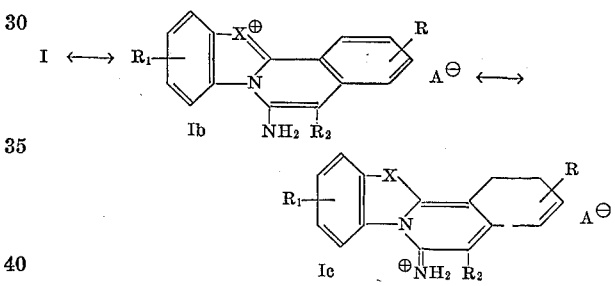

The new compounds of this invention are conveniently prepared by acid-catalyzed cyclization of 2-($\alpha$-cyano-o-tolyl)benzheterazoles (III) such as 2-($\alpha$-cyano-o-tolyl) benzothiazole and 2-($\alpha$-cyano-o-tolyl)benzoxazole. This method may be illustrated as follows:

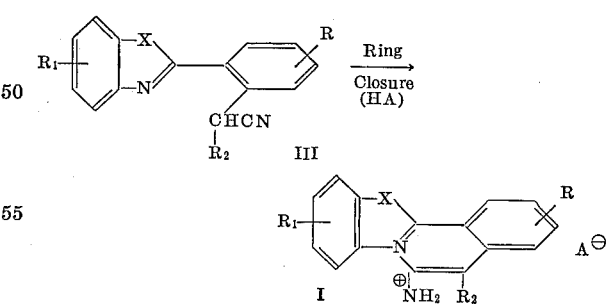

wherein R, $R_1$, $R_2$, X and A are as defined above. The cyclization is generally carried out in an aqueous acid such as hydrochloric, sulfuric, phosphoric and the like, at room temperature. However, organic acids such as acetic, propionic, and formic acid and the like in the presence of traces of a strong acid such as trifluoroacetic, hydrochloric, sulfuric and the like can be used. In these instances, the anion of the salt is that derived from the organic acid present in large excess. Other polar nonreactive organic solvents such as chloroform and dioxane are suitable for the reaction provided that suitable mineral acids are used in equivalent amounts. The temperature may also range between about 0° and 50° C. The reaction is substantially complete in from a few minutes to several hours or more.

The 2-(α-cyano-o-tolyl)benzheterazoles (III) necessary for this process are conveniently prepared from 2-(o-tolyl) benzheterazoles (IV) by bromination with N-bromosuccinimide in an inert solvent such as carbon tetrachloride in the presence of a radical initiator such as light, benzoyl peroxide, azobisiso-butyronitrile and the like or a combination of these.

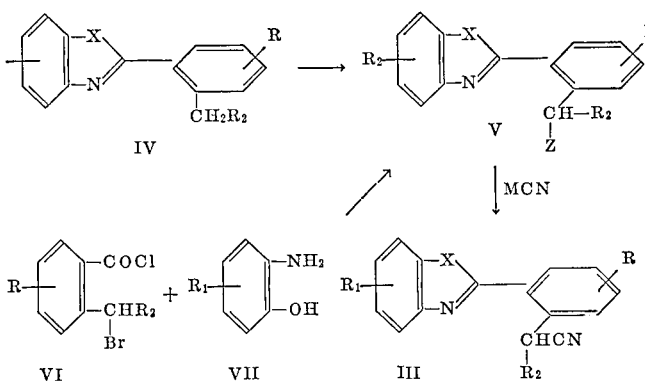

wherein R, R₁, R₂ and X are as defined above, M is an alkali metal and Z is halogen.

Subsequent treatment of the bromide (VI, Z=Br) with a metal cyanide such as sodium, potassium, or calcium cyanide and the like in a polar organic solvent such as methanol, dimethylformamide, dimethylsulfoxide, acetonitrile and the like then yields the desired intermediate 2-(α-cyano-o-tolyl)benzheterazoles (III).

Another route to the nitriles (III) which is particularly suitable in the oxygen series, i.e., to 2-(α-cyano-o-tolyl-benzoxazoles (III, X=O) involves bromination of a substituted o-toluoyl chloride with N-bromosuccinimide substantially as described above, to give (VI) followed by treatment with a substituted o-aminophenol (VII) in an inert medium such as acetone or acetonitrile in the presence of an acid binder such as N,N-dimethylaniline, ethyldi-iso-propylamine and the like. Subsequent treatment with an aqueous mineral acid such as hydrochloric acid and/or sodium hydroxide gives the substituted 2-(α-hydroxy-o-tolyl)benzoxazoles together with phenolic and basic impurities which are easily removed by washing with strong dilute bases such as sodium hydroxide and with dilute hydrochloric acid. The resulting 2-(α-hydroxy-o-tolyl)benzoxazoles (V, Z=(OH)) are then converted to either the α-haloderivatives by treatment with thionyl chloride, phosphorus oxychloride, or phosphorus pentabromide and the like or to reactive esters such as the arylsulfonyloxy esters (for example, p-toluenesulfonyloxy) and the like by treatment with, for example, p-toluenesulfonyl chloride in pyridine. Further reaction of these alkylating agents (V, Z=halogen, ArSO₂O etc.) with metal cyanides as described above yields the desired nitriles III.

A novel route to certain of the 2-(α-cyano-o-tolyl) benzothiazoles (III, Y=S, R₂=H) (IIIa) involves treatment of a substituted 6H-dibenzo[b,f][1,4]thiazocin-11 (12-H)-one (VIII) with phosphorus pentachloride in an inert solvent such as benzene, toluene, chloroform, o-dichlorobenzene and the like at temperatures from about 10° to 150° C. The products are the rearranged substituted 2-(α-chloro-o-tolyl)benzothiazoles (Va), which are formed in good yields. Conversion to the nitriles (IIIa) is effected as described above and subsequent ring closure yields Ia.

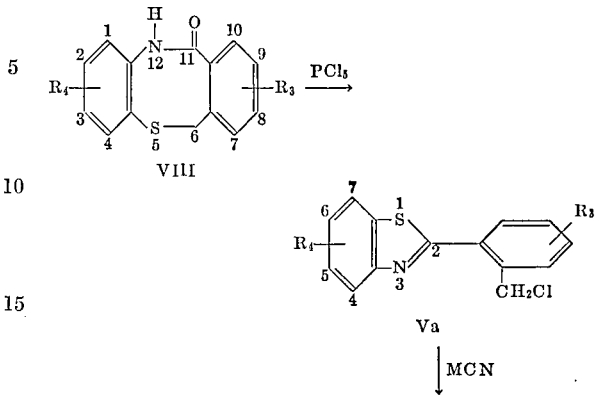

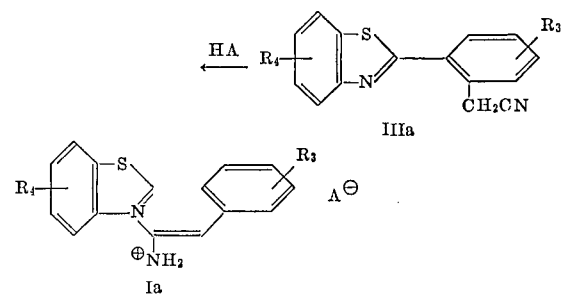

wherein R₃ and R₄ are selected from the group consisting of hydrogen, lower alkyl, hydrogen, lower alkyl mercapto, lower alkoxy, di(lower alkyl)sulfamoyl, cyano, lower alkyl sulfinyl, and lower alkyl sulfonyl.

Alternatively, a variety of substituents on the aromatic rings such as nitro, amino, diazonium and halogen groups may be converted in the desired R, R₁ and R₂ substituents either directly or sequentially by operating on either the cyclized derivatives I or on suitable intermediates such as the nitrile III by methods well known to those skilled in the art. In particular, alkylations and aralkylations are conveniently performed on the nitrile III.

The new compounds of this invention are useful as anti-inflammatory and analgesic agents. As such, they show activity in one or more of the following test procedures: anti-inflammatory actions when measured against carrageenin induced edema; analgesic actions when measured by the "writhing syndrome" test; anti-inflammatory actions when measured against erythema induced by ultraviolet light (in rats and guinea-pigs); antipyretic actions when measured against a yeast induced hyperthermia and anti-inflammatory activity when measured against adjuvant arthritis. They are also central nervous system depressants.

A useful test for anti-inflammatory activity consists of determining the drug-induced supression of inflammation in the paws of rats injected with dilute aqueous solutions of carrageenin according to C. A. Winter, E. A. Risley and G. W. Nuss, Proceedings of the Society for Experimental Biology and Medicine, vol. 111, pp. 544–547

(1962). By this method, rats are injected in the right hind paw with 0.05 milliliter of 1% carrageenin and the volume of the resulting edema is measured by displacement of mercury after four hours. The volume of the edema in the drug treated (250 mg./kg. orally) animals is compared with that of the untreated controls in the form of a control to treated ratio ($C/T$). Typically, 6-aminobenzothiazolo[2,3-a]isoquinolium chloride of this invention has a $C/T$ ratio of 1.61, which is a geometric means of the ratios measured in a two-stage sequential screening procedure. A two stage mean ratio of $\geq 1.43$ indicates the test compounds of this invention are accepted as active antiinflammatory agents when compared to parallel controls.

The novel compounds of the present invention are active analgesics when measured by the "writhing syndrome" test for analgesic activity as described by Siegmund et al., Proc., Soc. Exptl. Biol. Med., vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 6-aminobenzothiazolo-[2,3-a]isoquinolin-7-ium chloride and 6-aminobenzoxazolo-[2,3-a]-isoquinolin-7-ium chloride show analgesic activity when tested by this procedure at an oral dose of 200 mg./kg. of body weight. If desired, the median effective dose ($ED_{50}$) for any particular compound may be calculated from the results obtained by repeating this test in multiple groups of two mice each at several graded dose levels.

DETAILED DESCRIPTION

The following examples describe the specific illustrations of substituted benzoheterazoloisoquinolinium salts of the present invention.

EXAMPLE 1

Preparation of 6-aminobenzothiazolo[2,3-a]-isoquinolin-7-ium chloride

To a suspension of 18.1 g. of 6H-dibenzo[b,f][1,4]-thiazocin-11(12H)-one in 250 ml. of benzene is added 17.2 g. of phosphorus pentachloride with stirring at room temperature. After 3 hours, 200 ml. of water is added and solid potassium carbonate is added until the evolution of gas ceases. The phrases are separated and the benzene fraction is concentrated to give 15.7 g. of 2-(α-chloro-o-tolyl)benzothiazole, melting point 78–80° C.

A suspension of 2.7 g. of 2-(α-chloro-o-tolyl)benzothiazole and 0.5 g. of sodium cyanide in 50 ml. of dimethylformamide is stirred at room temperature for 48 hours. The resulting mixture is filtered and the filtrate is concentrated to dryness. The residue is crystallized from carbon tetrachloride to give 1.3 g. of 2-(α-cyano-o-tolyl)-benzothiazole, melting point 94–95° C.

A suspension of 3.8 g. of 2-(α-cyano-o-tolyl)benzothiazole in 20 ml. of concentrated hydrochloric acid is stirred at room temperature. Within 5 minutes the white solid dissolves and a yellow solid precipitates. After 1½ hours, the product is filtered, washed with 2.5 ml. of concentrated hydrochloric acid and dried under reduced pressure at 79° C. over phosphorus pentoxide to give 4.5 g. of 6 - aminobenzothiazolo[2,3-a]isoquinolin - 7-ium chloride, melting point 224–28° C., ultraviolet adsorption spectrum $\lambda_{max.}^{CH_3OH}$ 430 ($\epsilon=6300$), 333 ($\epsilon=8200$), 318 ($\epsilon=6400$), 276 sh. ($\epsilon=6600$), 280 ($\epsilon=32,000$), 230 ($\epsilon=24,100$) m$\mu$

EXAMPLE 2

Preparation of 6-aminobenzoxazolo[2,3-a]-isoquinolin-7-ium chloride and acetate

A suspension of 2.1 g. of 2-o-tolylbenzoxazole, 2.0 g. of N-bromosuccinimide and 120 mg. of benzoyl peroxide in 20 ml. of carbon tetrachloride is heated to reflux. After heating 2½ hours, the mixture is filtered and the filtrate is concentrated. To the residue is added 0.5 g. of sodium cyanide and 20 ml. of methanol. After stirring overnight (25°), the solution is concentrated to about 10 ml. and cooled. The precipitate is filtered and dried to give 0.65 g. of 2-(α-cyano-o-tolyl)benzoxazole, melting point 114–16° C.

To 0.65 g. of 2-(α-cyano-o-tolyl)benzoxazole is added 4 ml. of concentrated hydrochloric acid. After stirring 2 hours, the product is filtered and dried under reduced pressure over phosphorus pentoxide at 79° to give 0.55 g. of 6-aminobenzoxazolo[2,3-a]isoquinolin - 7-ium chloride, melting point 218–21° C., ultraviolet adsorption spectrum $\lambda_{max.}^{CH_3OH}$ 395 ($\epsilon=3400$), 312 ($\epsilon=5800$), 300 ($\epsilon=7400$), 289 ($\epsilon=8000$), 263 ($\epsilon=29,700$), 225 ($\epsilon=12,600$) m$\mu$ A solution of 25.2 mg. of 6-aminobenzoxazolo[2,3-a]-isoquinolin-7-ium chloride in 9 ml. of water is treated with 15 mg. of silver acetate in a little water. The cloudy precipitate which forms is coagulated by warming for ½ hour on a steam bath, and is collected on a filter to give 13 mg. (100%) of silver chloride. The filtrate contains 6-aminobenzoxazolo[2,3-a]isoquinolin-7-ium acetate and has essentially the same ultraviolet absorption spectrum above 250 m$\mu$ as the starting chloride, i.e., $\lambda_{max.}^{H_2O}$ 390, 313, 300, 290, 258, 226 m$\mu$

EXAMPLE 3

Preparation of 6-amino-2-chlorobenzoxazolo-[2,3-a]isoquinolin-7-ium chloride

To a suspension of 1.7 g. of 5-chloro-o-toluic acid and 100 mg. of benzoyl peroxide in 20 ml. of carbon tetrachloride, heated at reflux, is added dropwise a suspension of 1.8 g. of N-bromosuccinimide in 20 ml. of carbon tetrachloride. After heating 2 hours after the addition is completed, the mixture is cooled and filtered. The filtrate is concentrated and 20 ml. of thionyl chloride is added to the residue. The solution is warmed (50–60° C.) until the evolution of gas ceases. The resulting solution is concentrated and the residue is dissolved in 20 ml. of acetone. To this solution is added 1.2 g. of o-aminophenol in 30 ml. of acetone ($<15°$). This addition is followed by the addition of 1.4 g. of diisopropylethylamine. The ice-bath is removed and the reaction is stirred (25°) for two hours, after which it is concentrated to dryness. The oily residue is dissolved in a mixture of 6N hydrochloric and methylene chloride. The phases are separated and the organic phase is washed with 5% potassium carbonate, concentrated to dryness (2.7 g.) and the residue triturated with carbon tetrachloride filtered and the filtrate is concentrated to dryness (2.0 g.). The oily residue is triturated with 40 ml. of hot hexane, filtered and the insoluble fraction (1.4 g.) is developed on a 50 g. alumina column using a benzene-ethylacetate solvent system. The product thus obtained is recrystallized from hexane to give 0.11 g. of 2-benzoxazolyl-4-chlorobenzyl alcohol, melting point 145–6° C. Treatment of the latter product with thionyl chloride gives 2-(α,5 - dichloro-o-tolyl)benzoxazole followed by reaction with sodium cyanide in methanol gives 2-(5-chloro-α-cyano-o-tolyl)benzoxazole.

A suspension of this α-cyano-o-tolyl derivative in hydrochloric acid dissolves, and 6-amino-2-chlorobenzoxazolo-[2,3-a]isoquinolin-7-ium chloride is isolated therefrom by procedures similar to those described in Example 2.

EXAMPLE 4

Preparation of 6-amino-12-methylbenzimidazo[2,3-a]-isoquinolin-7-ium chloride

To a solution of 10.8 g. of o-phenylenediamine in 200 ml. of ethanol is added ethanolic-hydrogen chloride in excess of two equivalents. The suspension is concentrated, and 13.4 g. of o-tolunitrile is added to the residue and the suspension is heated to reflux. After 20 hours, the solution is cooled and the product triturated with 250 ml. of dichloromethane. The product is suspended in water, and the pH of the suspension adjusted to 7 by the addition of sodium bicarbonate. The product is filtered and recrystallized from ethyl acetate to give 14.9 g. of 2-(o-tolyl)benzimidazole, melting point 225-28° C.

To a solution of sodium methoxide in methanol is added 1 g. of 2-(o-tolyl)benzimidazole with stirring (10°). After 1 hour, 0.6 ml. of dimethylsulfate is added. Stirring is continued overnight at room temperature, the suspension is filtered, and 5 ml. of 5 N sodium hydroxide and 10 ml. of benzene are added to the filtrate. The aqueous layer is separated from the benzene layer which contains a solid suspension. The benzene layer is filtered (benzene insoluble fraction is recovered starting 2-(o-tolyl)benzimidazole) and the filtrate is concentrated. The residue is sublimed at 100° C. and 0.3 mm. to give 1-methyl-2-(o-tolyl)benzimidazole. A suspension of the product, N-bromosuccinimide and benzoyl peroxide in carbon tetrachloride is heated at reflux for 3 hours. The suspension is filtered hot and the filtrate is concentrated to dryness. The residue contains crude 2-(α-bromo-o-tolyl)-1-methylbenzimidazole.

The crude 2-(α-bromo-o-tolyl)-1-methylbenzimidazole is dissolved in methanol and treated with sodium cyanide. After stirring for 3 days at room temperature the solution is concentrated and 2-(α-cyano-o-tolyl)-1-methylbenzimidazole is isolated.

The α-cyano-o-tolyl derivative is dissolved in aqueous hydrochloric acid, following the cyclization procedure described in Example 1, and the cyclized product 6-amino-12-methylbenzimidazo[2,3-a]isoquinolin-7-ium chloride is isolated therefrom.

EXAMPLE 5

Preparation of 6-amino-2-chlorobenzothiazolo[2,3-a]isoquinolin-7-ium chloride 5-chloro-o-toluic acid is α-brominated with N-bromosuccinimide and benzoyl peroxide in refluxing carbon tetrachloride, and α-bromo-5-chloro-o-toluic acid is obtained. Treatment of this crude product with dilute aqueous potassium carbonate then precipitates 6-chlorophthalide. Heating the potassium salt of o-aminothiophenol and 6-chlorophthalide at 170° for 3 hours gives α-(o-aminophenylthio)-5-chloro-o-toluic acid. This acid when treated with thionyl chloride in chloroform then gives 9-chloro-6H-dibenzo[b,f][1,4]thiazocin-11(12-H)-one. Treatment of the dibenzothiazocin-one with phosphorus pentachloride in benzene at room temperature gives 2-(α,5-dichloro-o-tolyl)benzothiazole which is then treated with sodium cyanide in methanol to give 2-(5-chloro-α-cyano-o-tolyl)benzothiazole.

A suspension of the above cyano derivative in hydrochloric acid stirred at room temperature gives 6-amino-2-chlorobenzothiazol[2,3-a]isoquinolin-7-ium chloride following the general procedure of Example 1.

EXAMPLE 6

Preparation of 6-amino-9-chlorobenzothiazolo[2,3-a]isoquinolin-7-ium chloride

Following the procedures described in Example 5, the potassium salt of 2-amino-4-chlorothiophenol is condensed with phthalide, and the resulting α-(2-amino-4-chlorophenylthio)-o-toluic acid is cyclized with thioyl chloride followed by the rearrangement with phosphorus pentachloride to give 5-chloro-2-(α-chloro-o-tolyl)benzothiazole. Subsequent treatment of this benzothiazole derivatives with sodium cyanide in methanol then gives 5-chloro-2-(α-cyano-o-tolyl)benzothiazole.

Cyclization of the above 5-chloro-2-(α-cyano-o-tolyl)-benzothiazole with hydrochloric acid following the procedure of Example 1 produces 6-amino-9-chlorobenzothiazolo[2,3-a]isoquinolin-7-ium chloride.

EXAMPLE 7

Preparation of 6-amino-9-chlorobenzoxazolo[2,3-a]isoquinolin-7-ium chloride 5-chloro-2-(o-tolyl)benzoxazole obtained from the condensation of 4-chloro-2-aminophenol hydrochloride and o-tolunitrile as described in Example 2, is treated with N-bromo-succinimide and benzoyl peroxide in refluxing carbon tetrachloride, followed by the reaction of the α-bromo intermediate with sodium cyanide in methanol at room temperature to give 5-chloro-2-(α-cyano-o-tolyl)-benzoxazole.

A suspension of the above α-cyano-o-tolyl derivative in hydrochloric acid is stirred, the solid dissolves, and the 6-amino-9-chlorobenzoxazolo[2,3-α]isoquinolin-7-ium chloride is isolated therefrom.

EXAMPLE 8

Preparation of 6-amino-5-methylbenzoxazolo[2,3-a]isoquinolin-7-ium chloride 2-(2-ethylphenyl)benzoxazole obtained from the condensation of 2-aminophenol hydrochloride and 2-ethylbenzonitrile, as described in Example 2, is treated with N-bromo-succinimide and benzoylperoxide in refluxing carbon tetrachloride followed by the reaction of the α-bromo intermediate with sodium cyanide in methanol at room temperature to give 2-[2-(α-cyanoethyl)phenyl]-benzoxazole.

A suspension of the above α-cyano derivative in hydrochloric acid is stirred, the solid dissolves, and the 6-amino-5-methylbenzoxazolo[2,3-a]isoquinolin-7-ium chloride is isolated therefrom.

EXAMPLE 9

Preparation of 6-aminobenzimidazo[2,3-a]isoquinolin-7-ium chloride

A solution of o-carboxyphenyl acetonitrile in tetrahydrofuran is heated with carbonyldi-imidazole to effect loss of carbon dioxide and formation of the imidazole amide. The resulting solution is then treated with o-phenylenediamine to give 2'-amino-α-cyanotoluanilide which is isolated. Cyclization is effected by heating in N,N-dimethylaniline to give 2-(α-cyano-o-tolyl)benzimidazole.

Treatment of the above α-cyano derivative with concentrated hydrochloric acid, by the method of Examples 1 and 2, then gives 6-aminobenzimidazo[2,3-a]isoquinolin-7-ium chloride.

EXAMPLE 10

Preparation of 6-amino-10-nitrobenzoxazolo[2,3-a]isoquinolin-7-ium phosphate 2-amino-5-nitrophenol is condensed with o-tolunitrile by the method of Example 2. The resulting 6-nitro-2-(o-tolyl)benzoxazole is treated with N-bromosuccinimide followed by sodium cyanide as in Example 2 to yield 6-nitro-2-(α-cyano-o-tolyl)benzoxazole.

Treatment of the above α-cyano derivative with aqueous phosphoric acid then gives 6-amino-10-nitrobenzoxazolo[2,3-a]isoquinolin-7-ium phosphate.

EXAMPLE 11

Preparation of 6,10-diaminobenzoxazolo[2,3-a]isoquinolin-7-ium chloride hydrochloride 6-nitro-2-(α-cyano-o-tolyl)benzoxazole, prepared by the method of Example 10, is hydrogenated in ethanol in the presence of palladium on carbon to give 6-amino-2-(α-cyano-o-tolyl) benzoxazole.

Treatment of the above α-cyano derivative with concentrated hydrochloric acid then yields 6,10-diaminobenzoxazolo-[2,3-a]isoquinolin-7-ium chloride hydrochloride.

EXAMPLE 12

Preparation of 10-acetyl-6-aminobenzoxazolo[2,3-a]isoquinolin-7-ium sulfate 6-amino-2-(α-cyano-o-tolyl)benzoxazole, prepared by the method described in Example 11, is dissolved in two molar equivalents of dilute acetic acid at 0–5° and treated with one equivalent of sodium nitrate. The resulting 2-(α-cyano-o-tolyl)-benzoxazole-6-diazonium acetate is treated with the oxime of acetaldehyde in the presence of cupric sulfate and sodium sulfite to yield the oxime of 6-acetyl-2-(α-cyano-o-tolyl)benzoxazole.

Hydrolysis and cyclization of the above 6-acetyl-α-cyano oxime is effected with sulfuric acid to yield 10-acetyl - 6 - aminobenzoxazolo[2,3-a]isoquinolin - 7 - ium sulfate.

EXAMPLE 13

Preparation of 6-amino-10-methylmercaptobenzoxazolo[2,3-a]isoquinolin-7-ium chloride 2-(α-cyano-o-tolyl)benzoxazole - 6 - diazonium acetate prepared according to Example 12, is treated with methyl mercaptan to give 2-(α-cyano-o-tolyl)-6-methylmercaptobenzoxazole.

Cyclization of the above α-cyano derivative is effected with hydrochloric acid to give 6-amino-10-methylmercaptobenzoxazolo[2,3-a]isoquinolin-7-ium chloride.

EXAMPLE 14

Preparation of 6-amino-10-methoxybenzoxazolo[2,3-a]isoquinolin-7-ium phosphate

Reduction of 5-methoxy-2-nitrosophenol with palladium catalyst in a Parr hydrogenator followed by treatment with ethanolic hydrogen chloride gives 2-amino-5-methoxyphenol hydrochloride, 6-methoxy-2-(o-tolyl)benzoxazole, obtained from the condensation of above 2-amino-5-methoxyphenol hydrochloride, and o-tolunitrile as described in Example 2, is treated with N-bromosuccinimide and benzoyl peroxide is refluxing carbon tetrachloride followed by the reaction of the α-bromo intermediate with sodium cyanide in methanol at room temperature to give 2-(α-cyano-o-tolyl)-6-methoxybenzoxazole.

A suspension of the above α-cyano derivative in phosphoric acid is stirred; the solid dissolves and the 6-amino-10 - methoxybenzoxazolo[2,3-a]isoquinolin-7-ium phosphate is isolated therefrom.

EXAMPLE 15

Preparation of 6-amino-11-hydroxybenzoxazolo[2,3-a]isoquinolin-7-ium sulfate 7-hydroxy-2-(o-tolyl)benzoxazole, obtained from the condensation of 2-amino-6-hydroxyphenol hydrochloride and o-tolunitrile as described in Example 2, is treated with N-bromosuccinimide and benzoyl peroxide in refluxing carbon tetrachloride followed by the reaction of the α-bromo intermediate with sodium cyanide in methanol at room temperature to give 2-(α-cyano-o-tolyl)-7-hydroxybenzoxazole.

A suspension of the above α-cyano derivative in sulfuric acid is stirred, the solid dissolves, and the 6-amino-11-hydroxybenzoxazolo[2,3-a]isoquinolin-7-ium sulfate is isolated therefrom.

EXAMPLE 16

Preparation of 6-amino-10-di-n-propylaminobenzoxazolo[2,3-a]-isoquinolin-7-ium chloride hydrochloride 6-nitro-2-(α-cyano-o-tolyl)benzoxazole prepared as in Example 10, is hydrogenated in the presence of glacial acetic acid, ethanol, pre-reduced platinum oxide and excess n-propanol to give 6-di-n-propylamino-2-(α-cyano-o-tolyl benzoxazole.

Treatment of the above α-cyano derivative with concentrated hydrochloric acid by the method of Example 2 then yields 6 - amino-10-di-n-propylaminobenzoxazolo[2,3-a]isoquinolin-7-ium chloride hydrochloride.

EXAMPLE 17

Preparation of 6-amino-9-diethylsulfamoylbenzoxazolo[2,3-a]isoquinolin-7-ium sulfate o-Nitrophenol is sulfonated with oleum by a known process to yield 4-hydroxy-3-nitrobenzenesulfonic acid. This is heated with acetic anhydride and the resulting ester is treated with one molar equivalent of phosphorus pentachloride in toluene to give 4-acetoxy-3-nitrobenzene sulfonyl chloride. Treatment with a solution of diethylamine in cholorform then yields N,N-diethyl-4-hydroxy-3-nitrobenzenesulfonamide which is reduced with stannous chloride and concentrated hydrochloric acid in ether to give N,N-diethyl-4-hydroxy-3-aminobenzenesulfonamide.

The above compound is then condensed with o-tolunitrile by the procedure of Example 2 and the resulting 5-diethylsulfamoyl-2-(o-tolyl)benzoxazole is α-brominated and then treated with sodium cyanide by the methods of Example 2 to yield 9-diethylsulfamoyl-2-(α-cyano-o-tolyl) benzoxazole.

Cyclization of the above α-cyano derivative with aqueous sulfuric acid then gives 6-amino-9-diethylsulfamoylbenzoxazolo[2,3-a]isoquinolin-7-ium sulfate.

EXAMPLE 18

Preparation of 6-amino-10-cyanobenzoxazolo[2,3-a]isoquinolin-7-ium chloride

2 - (α-cyano-o-tolyl)benzoxazole-6-diazonium acetate, prepared according to Example 12, is treated with cuprous cyanide to give 6-cyano-2-(α-cyano-o-tolyl)benzoxazole.

Treatment of the above α-cyano derivative with hydrochloric acid yields 6-amino-10-cyanobenzoxazolo[2,3-a] isoquinolin-7-ium chloride.

EXAMPLE 19

Preparation of 6-amino-10-methylsulfinylbenzoxazolo[2,3-a]isoquinolin-7-ium chloride A solution of 6-amino-10-methylmercaptobenzoxazolo[2,3-a]isoquinolin-7-ium chloride in water at room temperature is treated with about one molar equivalent of hydrogen peroxide to yield 6-amino-10-methylsulfinylbenzoxazolo[2,3-a]isoquinolin-7-ium chloride.

EXAMPLE 20

Preparation of 6-amino-9-methylsulfonylbenzoxazolo[2,3-a]isoquinolin-7-ium chloride 5-methylsulfonyl-2-(o-tolyl)benzoxazole, obtained from the condensation of 2-amino-4-methylsulfonylphenol hydrochloride and o-tolunitrile as described in Example 2, is treated with N-bromosuccinimide and benzoyl peroxide in refluxing carbon tetrachloride followed by the reaction of the α-bromo intermediate with sodium cyanide in methanol at room temperature to give 2-(α-cyano-o-tolyl)-5-methylsulfonylbenzoxazole.

11

A suspension of the above α-cyano derivative in hydrochloric acid is stirred, the solid dissolves, and the 6-amino-9 - methylsulfonylbenzoxazolo[2,3 - a]isoquinolin - 7 - ium chloride is isolated therefrom.

EXAMPLE 21

Preparation of 6-amino-o-trifluoromethylbenzothiazolo [2,3-a]isoquinolin-7-ium chloride The potassium salt of 2-amino-4-trifluoromethylthiophenol is condensed with phthalide as described in Example 5. The amino-acid thus obtained is cyclized with thionyl chloride followed by rearrangement with phosphorous pentachloride to 2-(α-chloro-o-tolyl)-5-trifluoromethylbenzothiazole. Subsequent treatment of this product with sodium cyanide in methanol gives 2-(α-cyano-o-tolyl)-5-trifluoromethylbenzothiazole.

Cyclization of the above α-cyano derivative with hydrochloric acid gives 6-amino-9-trifluoromethylbenzothiazolo[2,3-a]isoquinolin-7-ium chloride.

EXAMPLE 22

Preparation of 6-amino-9-methylbenzothiazolo[2,3-a] isoquinolin-7-ium-chloride

The potassium salt of 2-amino-4-methylthiophenol is condensed with phthalide as described in Example 5. The amino-acid thus obtained is cyclized with thionyl chloride followed by rearrangement with phosphorus pentachloride to 2-(α-chloro-o-tolyl)-5-methylbenzothiazole. Subsequent treatment of this product with sodium cyanide in methanol gives 2-(α-cyano-o-tolyl)-5-methylbenzothiazole.

Cyclization of the above α-cyano derivative with hydrochloric acid gives 6-amino-9-methylbenzothiazolo[2, 3-a]isoquinolin-7-ium chloride.

EXAMPLE 23

Preparation of 6-amino-5-benzylbenzothiazolo[2,3-a] isoquinolin-7-ium chloride 3-benzalphthalide is hydrogenated by known methods over Raney nickel to give 3-benzylphthalide. This compound is condensed with o-aminothiophenol by the procedure of Example 1, and the product is cyclized with thionyl chloride to give 6-benzyldibenzo[b,f][1,4]thiazocin-11(12H)-one. Rearrangement with phosphorus pentachloride in benzene then gives 2-[o-(α-chlorophenethyl)phenyl]benzothiazole. Treatment with sodium cyanide in dimethylformamide at room temperature then gives the corresponding nitrile, 2-[o-(α-cyanophenethyl) phenyl]benzothiazole.

The above α-cyano derivative is cyclized with aqueous hydrochloric acid as in Example 1 to yield 6-amino-5-benzylbenzothiazolo[2,3-a]isoquinolin-7-ium chloride.

EXAMPLE 24

Preparation of 6-amino-9-bromobenzoxazolo[2,3-a]isoquinolin-7-ium chloride 2-nitrophenol is brominated with N-bromosuccinimide dimethylformamide to give 4-bromo-2-nitrophenol. Reduction with stannous chloride in hydrochloric acid then gives 2-amino-4-bromophenol hydrochloride.

5-bromo-2-o-tolylbenzoxazole obtained from the condensation of the 2-amino-4-bromophenol hydrochloride and o-tolunitrile as described in Example 2 is treated with N-bromosuccinimide and benzoyl peroxide in refluxing carbontetrachloride followed by the reaction of the α-bromo intermediate with sodium cyanide in methanol at room temperature to give 5-bromo-2-(α-cyano-o-tolyl)benzoxazole.

A suspension of the above α-cyano derivative in hydrochloric acid is stirred, the solid dissolves, and the 6-amino - 9 - bromobenzoxazolo[2,3-a]isoquinolin - 7 - ium chloride is isolated therefrom.

12

EXAMPLE 25

Preparation of 6-amino-8-fluorobenzoxazolo[2,3-a] isoquinolin-7-ium chloride 4-fluoro-2-(o-tolyl)benzoxazole, obtained from the condensation of 3-fluoro-2-aminophenol hydrochloride and o-tolunitrile as described in Example 2, is treated with N-bromo-succinimide and benzoyl peroxide in refluxing carbon tetrachloride followed by the reaction of the α-bromo intermediate with sodium cyanide in methanol at room temperature to give 2-(α-cyano-o-tolyl)-4-fluorobenzoxazole.

A suspension of the above α-cyano derivative in hydrochloric acid is stirred, the solid dissolves, and the 6-amino-8-fluorobenzoxazolo[2,3-a]isoquinolin-7-ium chloride is isolated therefrom.

EXAMPLE 26

Preparation of 6-amino-9-chloro-4-nitrobenzothiazolo [2,3-a]isoquinolin-7-ium chloride 3-nitro-p-toluic acid is brominated by the procedure of Example 3 and treated with aqueous sodium carbonate to give 4-nitrophthalide. Condensation with 2-amino-4-chlorothiophenol followed by cyclization with thionyl chloride by the method described in Example 1 gives 2-chloro-7-nitro-6H - dibenzo[b,f][1,4]thiazocin-11(12H)-one. Reaction with phosphorous pentachloride then gives 5-chloro-2-(α-chloro-3-nitro-o-tolyl)benzothiazole. Reaction with sodium cyanide in methanol yields the corresponding nitrile, 5 - chloro - 2 - (α-cyano-3-nitro-o-tolyl)-benzothiazole.

Cyclization of the above α-cyano derivative with hydrochloric acid gives 6-amino-9-chloro-4-nitrobenzothiazolo- [2,3-a]isoquinolin-7-ium chloride.

We claim:

1. A benzoheterazoloisoquinolinium salt of the formula:

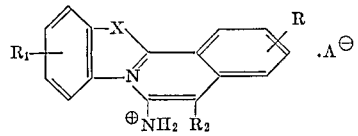

wherein R and $R_1$ are selected from the group consisting of hydrogen, lower alkyl, halogen, trifluoromethyl, nitro, lower alkyl mercapto, lower alkoxy, hydroxy, amino, lower alkylamino, di(lower alkyl)amino, di(lower alkyl) sulfamoyl, cyano, lower alkanoyl, lower alkyl sulfinyl, and lower alkyl sulfonyl; $R_2$ is selected from the group consisting of hydrogen, lower alkyl and phenyl lower alkyl; X is selected from the group consisting of oxygen, sulfur, >NH and >N-lower alkyl and $A^\ominus$ is the anion of a non-toxic acid.

2. The benzoheterazoloisoquinolinium salt in accordance with claim 1: 6-aminobenzothiazolo[2,3-a]isoquinolin-7-ium chloride.

3. A benzoheterazoloisoquinolinium salt in accordance with claim 1: 6-aminobenzoxazolo[2,3-a]isoquinolin-7-ium chloride or acetate.

4. The benzoheterazoloisoquinolinium salt in accordance with claim 1: 6-amino-2-chlorobenzoxazolo[2,3-a] isoquinolin-7-ium chloride.

5. The benzoheterazoloisoquinolinium salt in accordance with claim 1: 6-amino-12-methylbenzimidazo [2, 3-a]isoquinolin-7-ium chloride.

6. The benzoheterazoloisoquinolinium salt in accordance with claim 1: 6-amino-2-chlorobenzothiazolo[2,3-a] isoquinolin-7-ium chloride.

7. The benzoheterazoloisoquinolinium salt in accordance with claim 1: 6-amino-10-nitrobenzoxazolo[2,3-a] isoquinolin-7-ium phosphate.

8. A method of preparing benzoheterazoloisoquinolinium salts of the formula:

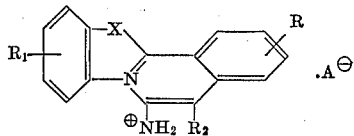

wherein R and $R_1$ are selected from the group consisting of hydrogen, lower alkyl, halogen, trifluoromethyl, nitro, lower alkyl mercapto, lower alkoxy, hydroxy, amino, lower alkylamino, di(lower alkyl)amino, di(lower alkyl) sulfamoyl, cyano, lower alkanoyl, lower alkyl sulfinyl, and lower alkyl sulfonyl; $R_2$ is selected from the group consisting of hydrogen, lower alkyl and phenyl lower alkyl; X is selected from the group consisting of oxygen, sulfur, >NH and >N-lower alkyl and $A^{\ominus}$ is the anion of a non-toxic acid, which comprises cyclizing a compound of the formula:

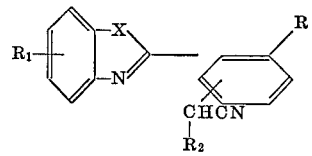

wherein R, $R_1$, $R_2$, X and A are as defined above, with an acid.

References Cited
UNITED STATES PATENTS 2,953,561  9/1960  Doorenbos _____ 260—283 X
3,253,986  5/1966  Franklin _____ 424—258

DONALD G. DAVIS, Primary Examiner

U.S. Cl. X.R.

240—158; 260—141, 304, 307, 309, 2, 327, 694, 999